United States Patent
Guo et al.

(10) Patent No.: US 9,407,714 B2
(45) Date of Patent: Aug. 2, 2016

(54) DATA REFRESHING OF APPLICATIONS

(71) Applicant: VMware, Inc., Palo Alto, CA (US)

(72) Inventors: Shugang Guo, Shanghai (CN); Weijin Wang, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 122 days.

(21) Appl. No.: 14/279,684

(22) Filed: May 16, 2014

(65) Prior Publication Data

US 2014/0344835 A1 Nov. 20, 2014

Related U.S. Application Data

(60) Provisional application No. 61/823,914, filed on May 16, 2013.

(51) Int. Cl.
| | | |
|---|---|---|
| *G06F 9/44* | (2006.01) | |
| *H04L 29/08* | (2006.01) | |
| *G06F 9/455* | (2006.01) | |
| *G06F 17/30* | (2006.01) | |
| *G06F 9/54* | (2006.01) | |
| *G06F 9/445* | (2006.01) | |
| *H04W 4/18* | (2009.01) | |

(52) U.S. Cl.
CPC ........ *H04L 67/2823* (2013.01); *G06F 9/44536* (2013.01); *G06F 9/455* (2013.01); *G06F 9/45533* (2013.01); *G06F 9/542* (2013.01); *G06F 17/30312* (2013.01); *H04L 67/2895* (2013.01); *H04W 4/18* (2013.01)

(58) Field of Classification Search
None
See application file for complete search history.

(56) References Cited

U.S. PATENT DOCUMENTS

| | | | |
|---|---|---|---|
| 5,615,326 A * | 3/1997 | Orton | G09G 5/14 715/807 |
| 7,949,999 B1 | 5/2011 | Willeford | |
| 8,458,419 B2 | 6/2013 | Basler et al. | |
| 2004/0143605 A1* | 7/2004 | Jupin | G06F 17/30864 |
| 2005/0206630 A1* | 9/2005 | MacLaurin | G06T 11/60 345/204 |
| 2007/0234195 A1* | 10/2007 | Wells | G06F 17/30905 715/205 |

(Continued)

OTHER PUBLICATIONS

"VMware vFabric Data Director Administrator and User Guide", vFabric Data Director, 2012, Version1.0, VMware, Inc. Also available at <URL: http://pubs.vmware.com/datadirector/topic/com.vmware.ICbase/PDF/vfabric-data-director-10-administration-guide.pdf>.

(Continued)

*Primary Examiner* — Brian W Wathen

(57) ABSTRACT

According to examples of the present disclosure, a method is provided to perform data refreshing of an application. The method may comprise registering a first view and a second view of the application to a group to which both the first view and the second view belong. The first view may be associated with a first data refresh function that is invocable to refresh data shown on the first view, and the second view with a second data refresh function that is invocable to refresh data shown on the second view. The method may further comprise, in response to determination that data refreshing is required for the first view in the group, performing data refreshing of the first view and the second view in the group by invoking the first function associated with the first view. Further, the method may comprise, in response to determination that data refreshing is also required for the second view in the group, performing data refreshing of the second view by invoking the second function associated with the second view.

25 Claims, 11 Drawing Sheets

(56) References Cited

U.S. PATENT DOCUMENTS

| | | | |
|---|---|---|---|
| 2008/0155223 A1 | 6/2008 | Hiltgen et al. | |
| 2008/0320050 A1* | 12/2008 | Chan | G06F 17/30893 |
| 2009/0007106 A1 | 1/2009 | Araujo, Jr. et al. | |
| 2010/0049929 A1 | 2/2010 | Nagarkar et al. | |
| 2010/0049930 A1 | 2/2010 | Pershin et al. | |
| 2011/0231696 A1 | 9/2011 | Ji et al. | |
| 2012/0059929 A1* | 3/2012 | Ramanathaiah | H04L 67/02 709/224 |
| 2012/0079221 A1 | 3/2012 | Sivasubramanian et al. | |
| 2012/0131480 A1 | 5/2012 | Kalmbach et al. | |
| 2012/0324183 A1 | 12/2012 | Chiruvolu et al. | |
| 2013/0014103 A1 | 1/2013 | Reuther et al. | |
| 2013/0047154 A1 | 2/2013 | Mehta | |
| 2013/0063448 A1* | 3/2013 | Fields, Jr. | G06T 15/005 345/473 |
| 2013/0159379 A1 | 6/2013 | Boskovic | |
| 2013/0185716 A1 | 7/2013 | Yin et al. | |
| 2013/0191509 A1 | 7/2013 | Loughry et al. | |
| 2013/0212460 A1* | 8/2013 | Balasubramanian | G06Q 30/0242 715/234 |
| 2013/0262390 A1 | 10/2013 | Kumarasamy et al. | |
| 2013/0262393 A1 | 10/2013 | Mrak et al. | |
| 2014/0280028 A1* | 9/2014 | Ding | G06F 17/30457 707/717 |

OTHER PUBLICATIONS

"VMware vSphere VMFS-Technical Overview and Best Practices", vSphere, 2012, Version 3.0, Vmware, Inc.

"VMware vFabric Data Director API Programming Guide", vFabric Data Director, 2012, Version 2.0, VMware, Inc. Also available at <URL: http://pubs.vmware.com/datadirector-20/topic/com.vmware.ICbase/PDF/vfabric-data-director-20-api_programming-guide.pdf>.

"VMware vFabric Data Director-Database as a Service in Your Cloud", Datasheet, 2012, VMware, Inc. Also available at <URL: https://www.vmware.com/files/pdf/vfabric/VMware-vFabric-Data-Director-Datasheet.pdf>.

"VMware vFabric Data Director Administrator and User Guide", vFabric Data Director, 2012, Version 2.7, VMware, Inc. Also available at <URL: http://pubs.vmware.com/datadirector-27/topic/com.vmware.ICbase/PDF/vfabric-data-director-27-administration-guide.pdf>.

* cited by examiner

400 

|  | Data stability function ||
|  | View level (using each view's data stability function) | Group level (using a group data stability function) |
| --- | --- | --- |
| View level (using each view's data refresh function) | 410<br>Registration – Fig. 5 at 532<br>Data refreshing – Fig. 6 | 420<br>Registration – Fig. 5 at 534<br>Data refreshing – Fig. 7 |
| Group level (using a group data refresh function) | 430<br>Registration – Fig. 5 at 542<br>Data refreshing – Fig. 8 | 440<br>Registration – Fig. 5 at 544<br>Data refreshing – Fig. 9 |

(left axis label: Data refresh function)

Fig. 4

DATA REFRESHING OF APPLICATIONS

CROSS-REFERENCE TO RELATED APPLICATIONS

The present application claims the benefit of U.S. Provisional Application No. 61/823,914 filed May 16, 2013, and is related in subject matter to U.S. patent application Ser. Nos. 14/275,904 and 14/279,951, all three of which are incorporated herein by reference.

BACKGROUND

Unless otherwise indicated herein, the approaches described in this section are not admitted to be prior art by inclusion in this section.

When data shown on an application changes, data refreshing of the application is required. For example, the changes may be due to a user's interaction with the application, such as generating a create, retrieve, update and delete (CRUD) operation to create new data, retrieve data from a database, update or delete existing data shown on the application, respectively. The changes may also be due to a user navigating through the user interface of the application. Data refreshing may require a lot of processing and bandwidth resources to, for example, retrieve the data and render a user interface of the application.

BRIEF DESCRIPTION OF DRAWINGS

FIG. 4 is a table illustrating example implementations for data refreshing of an application using the example refresh framework in FIG. 3;

DETAILED DESCRIPTION

Figure 1:
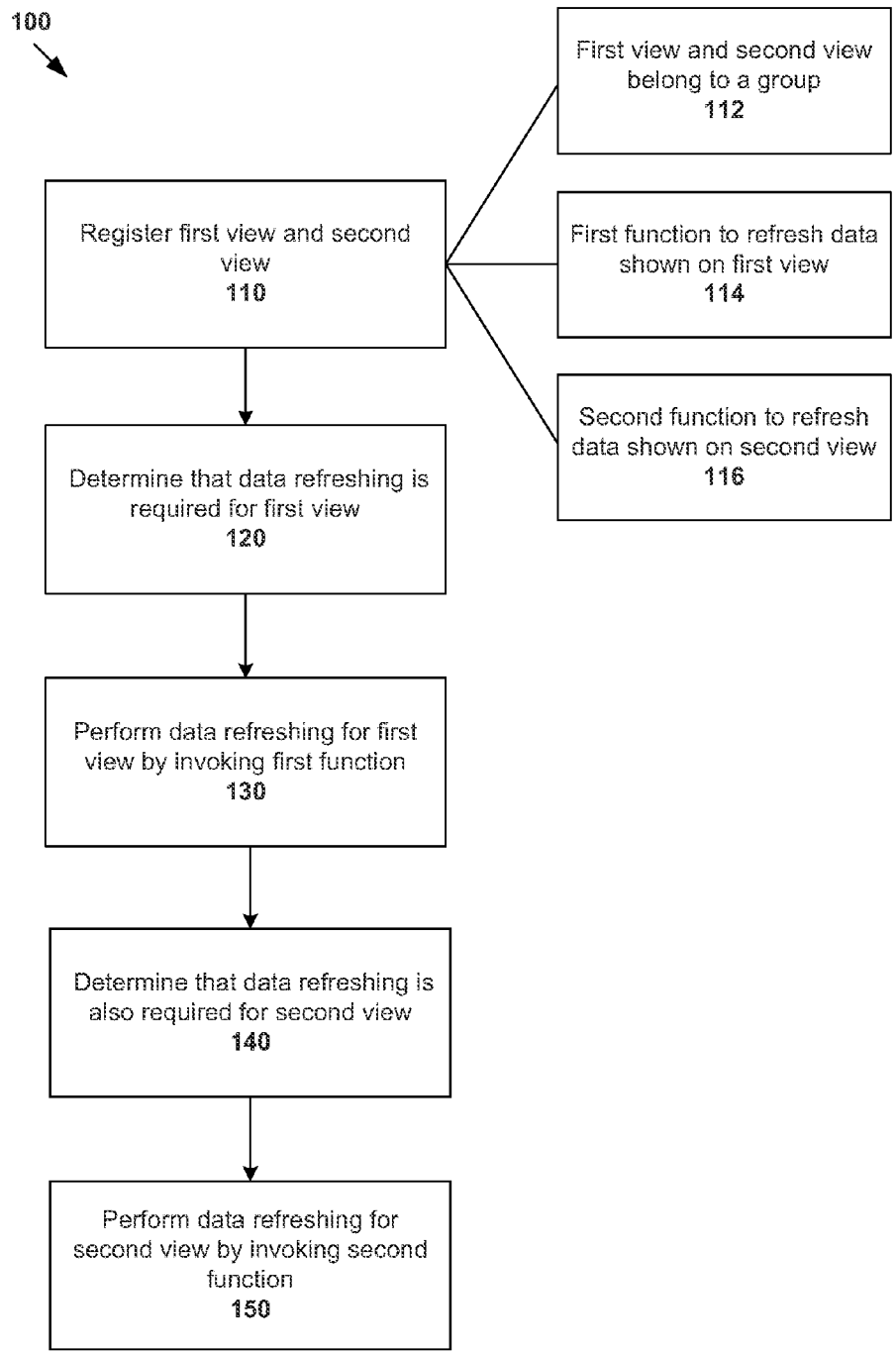
FIG. 1 is a flowchart of an example process for data refreshing of an application.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

According to examples in the present disclosure, data refreshing may be performed for multiple "views" of an application. The "views", which may generally refer screens or interfaces that form the application, may be grouped based on their refresh requirements. When it is determined when data refreshing is required for one view in the group, data refreshing may be performed for at least one other view in the group. As such, data refreshing for multiple views may be controlled and performed simultaneously. Data refreshing of multiple views according to examples of the present disclosure also improves data consistency across related views in a group. For example, if one view displays a list of active virtual machines in a system, another view should display the relevant action item that is available for the active virtual machines.

In more detail, FIG. 1 is a flowchart of example process 100 for data refreshing of an application. Example process 100 may include one or more operations, functions, or actions illustrated by one or more blocks, such as blocks 110 to 150. The various blocks may be combined into fewer blocks, divided into additional blocks, and/or eliminated based upon the desired implementation.

At block 110 in FIG. 1, a first view and a second view of the application are registered for data refreshing. Both the first view and the second view may belong to a group (see block 112); the first view may be associated with a first function that is invocable to refresh data shown on the first view (see block 114); and the second view may be associated with a second function that is invocable to refresh data shown on the second view (see block 116).

At block 120 in FIG. 1, it is determined whether data refreshing is required for the first view. At block 130 in FIG. 1, in response to the determination that data refreshing is required for the first view, data refreshing is performed for the first view by invoking the first function associated with the first view.

At block 140 in FIG. 1, since the second view belongs to the same group as the first view, it is determined whether data refreshing is also required for the second view. At block 150, in response to determination that data refreshing is also required for the second view, data refreshing is performed for the second view by invoking the second function associated with the second view.

Data refreshing may be determined as required at block 120 if the first view becomes visible, such as when a visibility status of the first view that changes from invisible to visible. Similarly, at block 140, data refreshing may be required for the second view if it also visible. In another example, a data stability status of data shown on the first view may be monitored, and data refreshing is determined as required if the status indicates instability and the first view is visible. In these examples, unnecessary processing costs for invisible views may be reduced by only refreshing visible views. For example, data refreshing at blocks 130 and 150 may involve retrieving data from a database and re-rendering the first view and second view to display the retrieved data. Data refreshing may also involve creating, updating or deleting data shown on the first view and second view.

Example process 100 may be implemented by any suitable device, generally a client device executing the application (e.g., using client-side code in thick client architecture). Alternatively, example process 100 may be implemented by a server supporting the application (e.g., using server-side code in thin client architecture), or a combination of both client and server implementations.

Throughout the present disclosure, the terms "first function" and "second function" refer generally to computer methods, procedures, subroutines, or any other set of computer-readable instructions that may be invoked to perform data refreshing. The terms "invoke" or "invoking" refer generally to calling a function, which may include providing suitable parameters to call the function. The term "invocable" indicates capability of being invoked.

The term "application" refers generally to any program instructions or functional components that execute on a device (e.g., client device), such as a web application, mobile application (executed on a mobile device such as smartphone, tablet, personal digital assistant, etc.) and desktop application (executed on a desktop computer), etc. The application includes multiple views, which a user may interact with and navigate using any suitable input devices (e.g., touchscreen, keyboard, stylus, mouse etc.). The application may provide any suitable services to the client device, such as database provisioning and management, etc.

The application may be a "web application", which refers generally to an application that is provided by a server and accessible by a client device via a network. Web applications, such as Rich Internet Applications (RIAs), provide more features than basic web applications and may be delivered by way of a site-specific browser, a browser plug-in, an independent sandbox, JavaScript, or a virtual machine, etc. From an application developer's perspective, web applications are generally less expensive and less complicated to develop and deploy. User's experience also improves, since web applications are generally easier to use without having to fully install them locally at the client device, or manually update them when new versions are available.

According to examples in the present disclosure, example process 100 facilitates centralized and automatic data refreshing for multiple views in a group, such as based on the view's visibility and stability. This improves over conventional approaches that merely add an auto-refresh feature to individual views. In more detail, unlike example process 100, the individual auto-refresh function generally does not determine under which condition or when data refreshing should be performed. Further, since data refreshing is implemented independently for each view in the conventional approaches, it is more time consuming to maintain the code required. When it is necessary to update the code to update the auto-refresh feature or when conditions for data refreshing change, the code must be updated for each view to avoid the views behaving inconsistently.

Similarly, example process 100 also improves over conventional approaches that define an auto-refresh feature in one class, which is called by each view when data refreshing is required. In this case, it is necessary for each view to maintain an auto-refresh class, increasing the consumption of memory for the maintenance. Again, each view still has to determine when to call the auto-refresh feature, and without knowledge of the data refreshing requirement of other (related) views, it is generally difficult to maintain data consistency across multiple views.

Further, using the conventional approaches discussed above, it may be more complicated and time consuming to implement data refreshing for multiple views having similar data at the same time. For example, the first view of the application is for creating a new "book" object, and the second view is to show information of the newly created object. Using example process 100, the first view and second view are grouped together and when data refreshing is performed for the first view, data refreshing is also performed for the second view if necessary (e.g., when the second view is also visible).

Computing Environment

Figure 2:
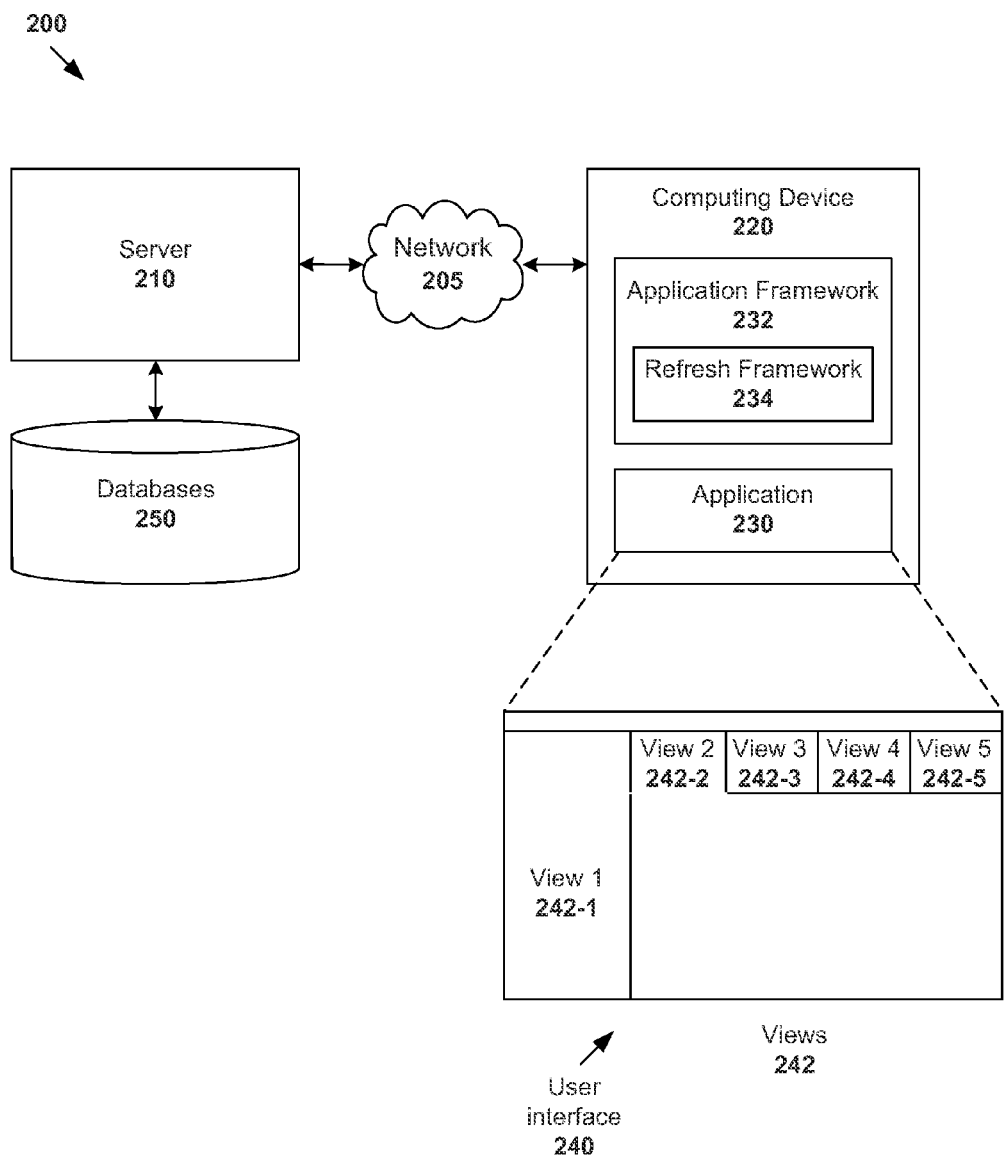
FIG. 2 is a schematic diagram of an example computing environment in which data refreshing of an application may be implemented.

FIG. 2 is a schematic diagram of an example computing environment 200 in which data refreshing of application 230 may be implemented. Although an example is shown, it should be understood that example computing environment 200 may include additional or alternative components, and may have a different configuration.

Computing environment 200 includes server 210 (e.g., web server, application server, etc.) that communicates with client device 220 over network 205 (e.g., Internet, Intranet, etc.). Client device 220 executes application 230, such as a web application, mobile application and desktop application, etc. In the case of a web application, client device 220 may access a service provided by server 210 via application 230 using any suitable client-side program, such as web browser, etc.

Application 230 may be implemented based on "application framework" 232, which refers generally to a set of classes that provides application functionality and services. The set of classes represents a library of software code that may be used and reused by application developers to reduce development time and complexity. This saves an application developer from the task of rewriting a large amount of standard software code when building a new application.

Any suitable application framework 232 may be used, such as Apache Flex, JavaFX and Microsoft Silverlight, etc. for rich Internet applications (RIAs). For example, Apache Flex supports a component-oriented programming model that allows developers to assemble applications from components and extend base components to create custom interactions. A web browser may load the relevant application framework package (e.g., Apache Flex package) from server 210 and execute it on client device 220. Apache Flex source code may be compiled into Flash bytecode (e.g., a SWF file) that is executed by client device 220 to render user interface 240 of application 230 on a client-side program (e.g., web browser). Other example web application frameworks include Google Web Toolkit (GWT), Vaadin and Ext JS, etc.

User interface 240 of application 230 may include multiple views such as 242-1 to 242-5, which will be collectively referred to as "views 242" or individually as a general "view 242." For example, in a server-client architecture such as example 200 in FIG. 2, server 210 generally connects to databases 250 to access data for delivery to computing device 220 and display on views 242. In a database management application, views 242 may include View 1 (e.g., "left navigation" view 242-1) to display a list of databases. The user can navigate through different tabs or screens represented by View 2 (e.g., "databases" view 242-2) to display database properties (e.g., name, status, database type, cluster role, base database template, etc.); and View 3 (e.g., "backup and recovery" view 242-3) to display information relating to backup and recovery (e.g., backup type, recovery point, etc.). Remaining views 242-4 and 242-5 may be relating to "tasks and events" (i.e. View 4), "reports" (i.e. View 5), as well as "logs" and "permissions" (both not shown for simplicity), etc.

Depending on application framework 232, views 242 may be implemented using any suitable approach. For example, using Apache Flex, view 242 may be implemented using a container class (e.g., view and viewNavigator classes in Apache Flex, etc.) and the transition from one view to another may be managed by defining a state for each view (e.g., view states in Apache Flex, etc.). To a user interacting with web browser using client device 220, application 230 is presented as a series of views 242.

Refresh Framework

To facilitate data refreshing of views 242 of application 230, application framework 232 includes a refresh framework to facilitate registration of views 242 according to block 110 and data refreshing according to blocks 120 to 150 in FIG. 1. As used herein, the term "refresh framework" 234 refers generally to a set of interrelated programs, methods, applications, components or classes that facilitate data refreshing according to example process 100 FIG. 1.

Figure 3:
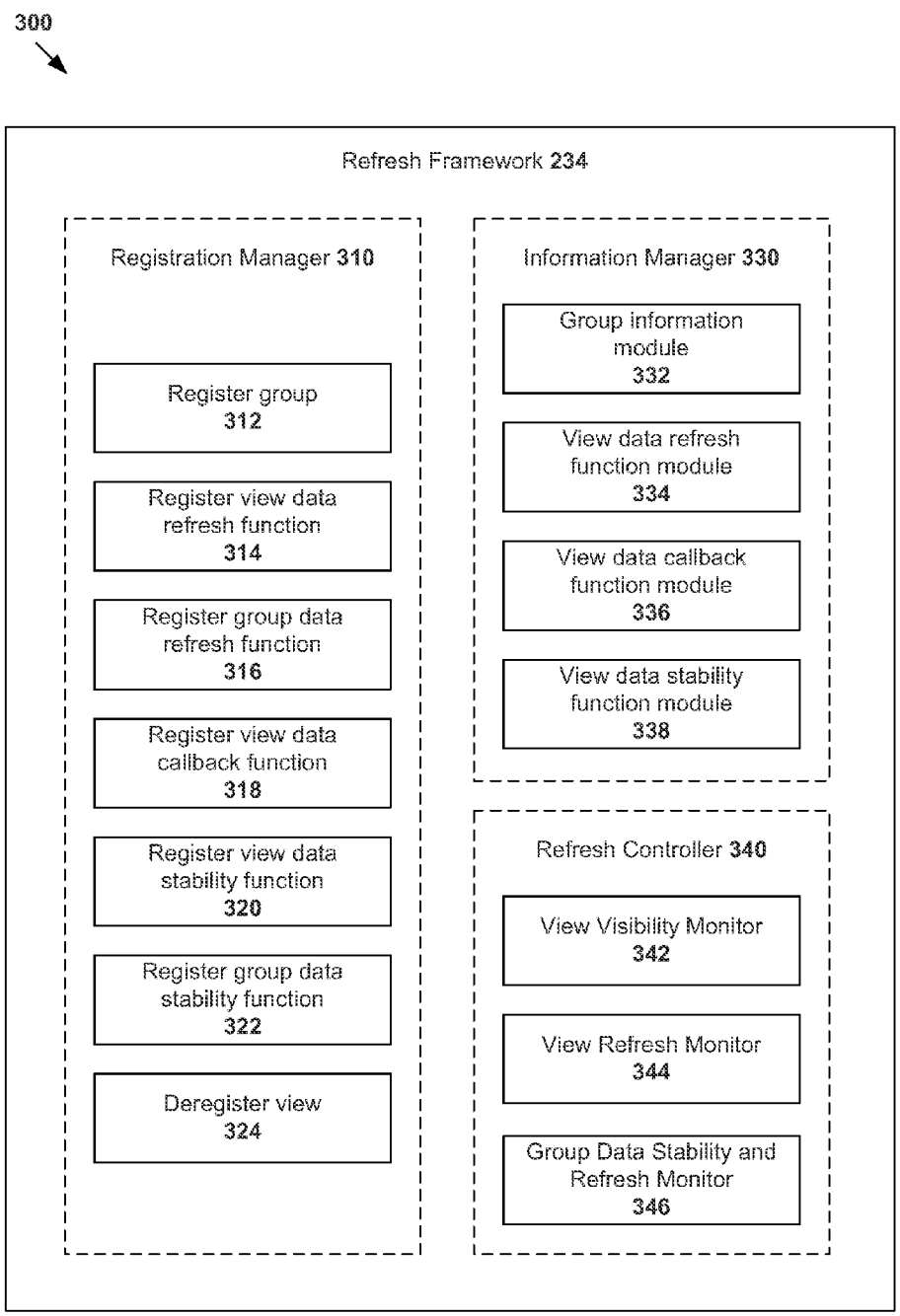
FIG. 3 is a schematic diagram of an example refresh framework for data refreshing of an application.

FIG. 3 is a schematic diagram of example refresh framework 234 for data refreshing of application 230. Although an example is shown, it should be understood that refresh framework 234 may include additional or alternative components, and may have a different configuration. Refresh framework 234 is generally implemented by client device 220 (e.g., using client-side code in a thick client architecture). Alternatively or additionally, depending on application 230, refresh framework 234 may be implemented by server 210 or a combination of server 210 and client device 220.

In the example in FIG. 3, refresh framework 234 includes registration manager 310 to register and deregister views 242, information manager 330 to maintain information of registered views 242, and refresh controller 340 to control and perform data refreshing of views 242. Registration manager 310 includes various modules for view registration (see 312 to 322) and deregistration (see 324). The modules (see 312 to 324) may be used by view instances, such as when they are added to user interface 240. Views 242 generally have an initialization function and their registration may occur when the initialization function is called to add view 242.

"Register group" module (see 312) of registration manager 310 is to register views 242 to a group. For example, views 242 are assigned to one or more groups, such as View 1 and View 2 to Group 1, and View 2 to Group 1 and Group 2, etc. As such, the relationship between views 242 and groups is many to many, i.e. each group may have multiple views and a view may belong to multiple groups. Grouping of views 242 may be performed during the development of application 230 (e.g., based on business logic) and updated as application 230 evolves into newer versions.

Views 242 of application 230 are grouped based on their data refreshing requirements. The grouping may be based on any suitable requirements, such as if they display similar or related data for the same entity (e.g., database object), or they have requirements to synchronize a state of the entity, etc. Views 242 in the same group may or may not be visible on user interface 240 at the same time. The group assignment process allows multiple views 242 belonging to the same group 112 to be updated at the same time. That is, if data refreshing is performed for View 1, other views in the same group (e.g., View 2 in Group 1) that require data refreshing may also be similarly refreshed. In another example, if two views (e.g., View 1 and View 2) display the same data item (e.g., database name, etc.), both views may be refreshed as the data item changes. If similar or related data items (e.g., number of databases in View 1 and list of databases in View 2) are displayed, they may also be refreshed at the same time.

Registration manager 310 further includes various modules for registering view-level data refresh functions (see "Register view data refresh function" 314) and group-level data refresh functions (see "Register group data refresh function" 316). In general, views 242 in a group may have similar or related data items that need to be fetched for data refreshing. For example, application 230 may wish to retrieve a virtual machine's unique model (e.g., includes attributes such as name, description, storage, memory, etc.) for multiple views (e.g., View 1, View 2 and View 3). View 1 may display only the name, View 2 displays the name and description, and View 3 displays all attributes.

The group data refresh function allows all attributes of the virtual machine to be fetched at the same time. Although possibly reducing redundant retrieval, it might take longer and consume more resources to fetch all the required attributes at the same time. This might adversely affect the user's experience. As such, if all the data cannot be fetched within a predetermined time, the "data refresh function" of each view may be registered with "Register view data refresh function" module (see 314). For example, a first data refresh function for View 1 retrieves the name only, a second data refresh function for View 2 retrieves the name and description, while a third data refresh function for View 3 retrieves all attributes.

However, if the data may be fetched within a predetermined time, a group data refresh function for View 1 to View 3 is registered using "Register group data refresh function" module (see 316). In this case, a data callback function of each view is registered with "Register view data callback function" module (see 318).

For example, when a group data refresh function is invoked to fetch data, the fetched data for the group may be one or more parameters of view's 242 data callback function. From the perspective of view 242, when its data callback function is invoked, view 242 is notified of the need to refresh data, and uses the fetched data to perform data refreshing accordingly. As used herein, the term "data callback function" may refer generally to a function, subroutine, or the like, that is invocable to perform data refreshing for view 242 using the data fetched by its associated group data refresh function. The data callback functions may be implemented using any suitable approach, such as a listener function, etc. For example, a data callback function may be defined in refresh framework 234 as a "Function" object in Apache Flex, or an implementation of the listener interface in Java, etc.

Similarly, to determine whether data shown on view 242 is stable, registration manager 310 further includes various modules for registering view-level data stability functions (see "Register view data stability function" 320) and group-level data refresh functions (see "Register group data stability function" 322). For example, a first data stability function may be registered for View 1 and a second data stability function for View 2, etc. If the group-level function is used, a group data stability function may be registered for both View 1 and View 2 to determine whether data shown are stable or otherwise. Similar to the group-level data refresh function, the group-level data stability function may be implemented if it is efficient to do so.

Registration manager 310 also includes "Deregister view" module (see 324) to deregister views 242, such as when views 242 are removed from user interface 240. This may be monitored using a "display object" or "monitored view" list that is updated as views 242 are registered and deregistered.

Refresh framework 234 further includes information manager 330 to store and allow retrieval of information provided during the registration process using any suitable modules. For example, "Group information" module 332 is to manage view and group information, including the name, key, group-level functions (e.g., group data refresh function and group data stability function, where applicable). "View data refresh function" module 334 is to manage each view's data refresh function (e.g., first data refresh function of View 1 and second data refresh function of View 2). "View data callback function" module 336 is to manage each view's data callback function (e.g., first data callback function of View 1 and second data callback function of View 2). "View data stability function" module 338 to manage each view's data stability function (e.g., first data stability function of View 1 and second data stability function of View 2).

Refresh framework 234 further includes refresh controller 340, which includes "View visibility monitor" 342 and "View refresh monitor" 344 for data refreshing using view-level functions; and "Group data stability and refresh monitor" 346 for data refreshing using group-level functions.

FIG. 4 is a table illustrating example implementations for data refreshing of an application using the example refresh framework in FIG. 3. In particular, depending on whether data refreshing and data stability monitoring are performed at a view level or group level, there are different implementations for registration and data refreshing. For example, the decision as to whether view or group level functions should be implemented may be made by an application developer based on any suitable factor, such as application's 230 performance and architecture, etc. The example implementations will be explained with reference to FIG. 5 (registration) and FIG. 6 to FIG. 9 (data refreshing).

In more detail, in example 410 in FIG. 4, data refreshing and data stability monitoring are both performed at a view level. View registration (e.g., View 1 and View 2) includes registering each view's 242 data refresh function (e.g., first data refresh function of View 1 and second data refresh function of View 2) and data stability function (e.g., first data stability function of View 1 and second data stability function of View 2). See also flow leading to block 532 in FIG. 5 (registration) and FIG. 6 (data refreshing).

In example 420 in FIG. 4, data refreshing is performed at a view level, and data stability monitoring at a group level. View registration (e.g., View 1 and View 2) includes registering each view's data refresh function (e.g., first data refresh function of View 1 and second data refresh function of View 2) and a group data stability function for both View 1 and View 2. See also flow leading to block 534 in FIG. 5 (registration) and FIG. 7 (data refreshing).

In example 430 in FIG. 4, data refreshing is performed at a group level, and data stability monitoring at a view level. View registration (e.g., View 1 and View 2) includes registering a group data refresh function for both View 1 and View 2, and each view's data stability function (e.g., first data stability function of View 1 and second data stability function of View 2). See also flow leading to block 542 in FIG. 5 (registration) and FIG. 8 (data refreshing).

In example 440 in FIG. 4, data refreshing and data stability monitoring are both performed at a group level. View registration (e.g., View 1 and View 2) includes registering a group data refresh function and a group data stability function for both View 1 and View 2. See also flow leading to block 544 in FIG. 5 (registration) and FIG. 9 (data refreshing).

Examples 410 to 440 will now be explained with reference to FIG. 5 to FIG. 9. Although a group of two views (e.g., View 1 and View 2) are used in the examples for simplicity, it will be appreciated that the group may include more than two views and example processes 500 to 900 apply accordingly.

Registration of Views

Figure 5:
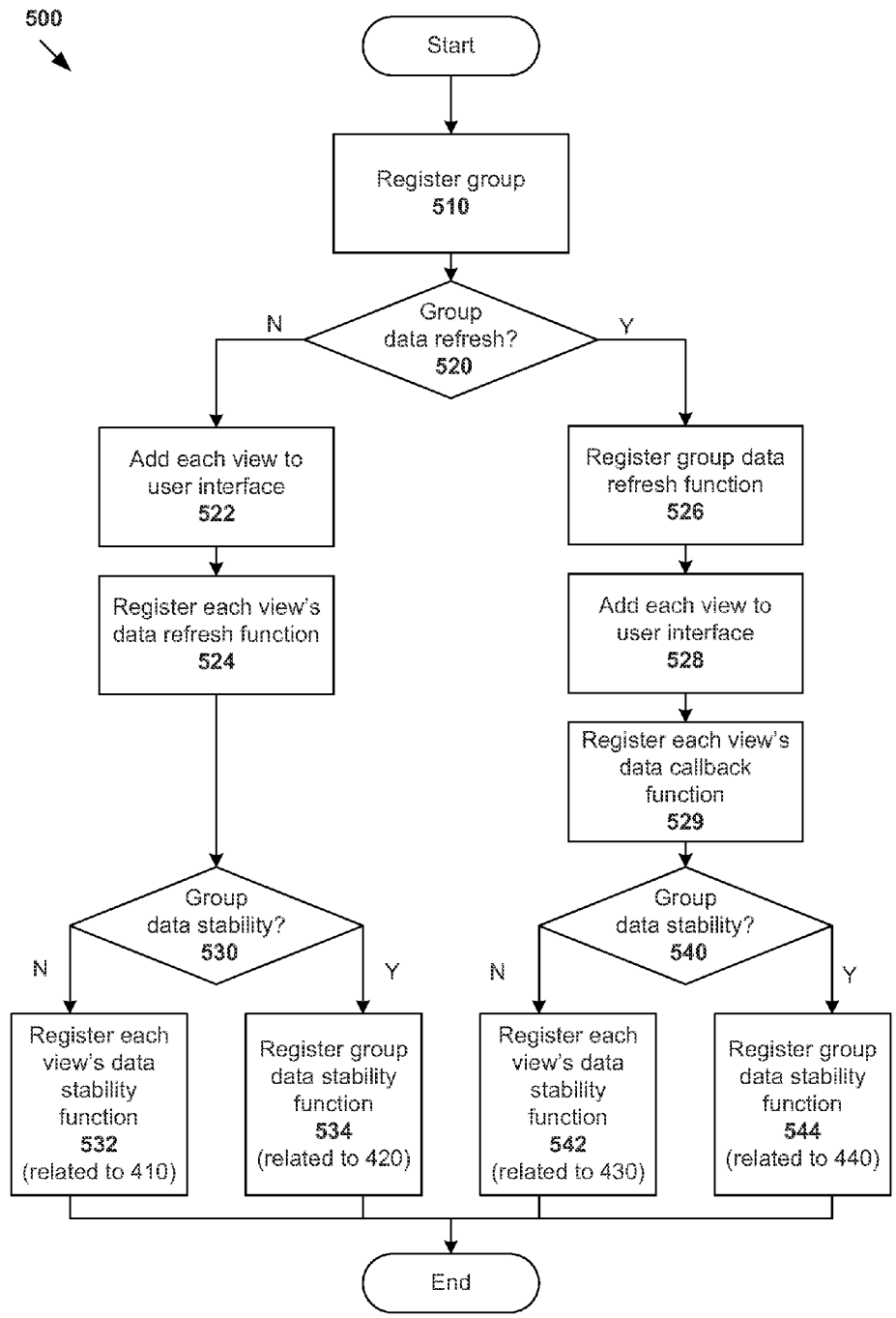
FIG. 5 is a flowchart of an example process for registering views for data refreshing using the example refresh framework in FIG. 3.

FIG. 5 is example process 500 for registering views 242 for data refreshing using example refresh framework 234 in FIG. 3. Example process 500, which relates to block 110 in FIG. 1, may include one or more operations, functions, or actions illustrated by one or more blocks, such as blocks 510 to 544. The various blocks may be combined into fewer blocks, divided into additional blocks, and/or eliminated based upon the desired implementation.

At block 510 in FIG. 5, a group of views 242 (e.g., View 1 and View 2) are registered using "Register group" module 312 of registration manager 310. Registering the group includes storing information relating to the group and views 242 in the group.

Blocks 520, 522, 524, 530 and 532 in FIG. 5 relate to example 410 in FIG. 4. For each view (e.g., View 1) in the group, "Register view data refresh function" module 314 adds the view to user interface 240 and its data refresh function (e.g., first data refresh function). "Register view data stability function" module 320 also registers each view's data stability function (e.g., first data stability function of View 1).

Blocks 520, 522, 524, 530 and 534 in FIG. 5 relate to example 420 in FIG. 4. Example 420 is the same as example 410, except that block 534 is performed instead of 532 to register a group data stability function using "Register group data stability function" module 322.

Blocks 520, 526, 528, 529, 540 and 542 in FIG. 5 relate to example 430 in FIG. 4. Example 430 is the same as example 410, except that a group-level data refresh function is registered instead of view-level functions. "Register group data refresh function" module 316 is used to register the group data refresh function. "Register view data callback function" module 318 adds each view (e.g., View 1) to user interface 240 and registers each view's callback function (e.g., first data callback function of View 1). "Register view data stability function" module 320 also registers each view's data stability function (e.g., first data stability function of View 1).

Blocks 520, 526, 528, 529, 540 and 544 in FIG. 5 relate to example 440 in FIG. 4. Example 440 is the same as example 430, except that block 544 is performed instead of 542 to register a group data stability function using "Register group data stability function" module 322.

View-Level Data Refreshing and View-Level Data Stability Monitoring

Figure 6:
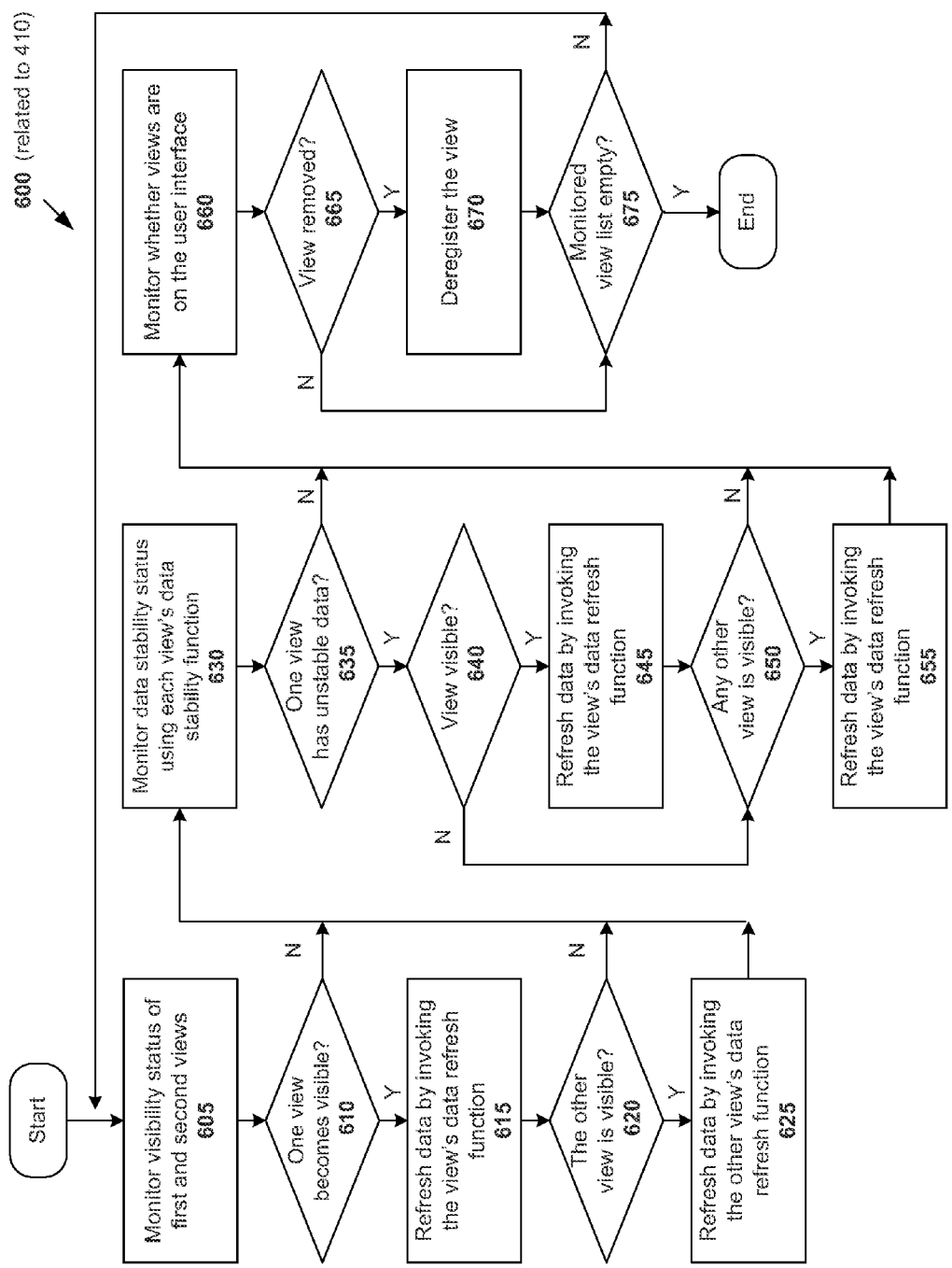
FIG. 6 is a flowchart of an example process for data refreshing of an application using view-level data refresh functions and view-level data stability functions.

FIG. 6 is a flowchart of example process 600 for data refreshing of application 230 using view-level data refresh functions and view-level data stability functions. Example process 600, which relates to example 410 in FIG. 4, may include one or more operations, functions, or actions illustrated by one or more blocks, such as blocks 605 to 675. The various blocks may be combined into fewer blocks, divided into additional blocks, and/or eliminated based upon the desired implementation.

In the example in FIG. 6, blocks 605 to 655 relating to data refreshing may be performed by refresh controller 340 using information obtained from information manager 330. Blocks 660 to 675 relating to view deregistration may be performed by registration manager 310. Using example process 600, data refreshing may be determined as required based on a visibility status of views 242 (see blocks 605 to 625) and/or data stability status of data shown on views 242 (see blocks 630 to 655) in a group.

At block 605 in FIG. 6, refresh controller 340 monitors a visibility status of each view 242 (e.g., View 1 and View 2) belonging to a group registered for data refreshing. Any suitable implementation may be used to monitor the visibility status. For example, using Apache Flex, an event listener may be added to a "Stage" class instance associated with view 242 to listen to view visibility change events, such as "stage.addEventListener(event.visibleChanged, callback)". The events may be monitored in this way because views are added as children of the "Stage" class, which is the top-level view container for all views that can monitor all views visibility change event. The "callback" in "stage.addEventlistener( )" is a function used to determine whether view 242 triggering the visibility change event is related to a registered view. Here, "related" may mean the view is a parent of a registered view 242 (e.g., View 1), or a registered view 242 (e.g., View 1) itself.

In another example, also using Apache Flex, the visibility change event may also be monitored by adding, to every view in user interface 240, an event listener for view visibility changed events to, such as "view.addEventlistener (event.visibleChanged, callback)." The "callback" in "view.addEventlistener( )" is a function used to determine whether view 242 triggering the visibility change event is related to a registered view. Here, "related" may mean the view is a parent of a registered view 242 (e.g View 1), or a registered view 242 (e.g. View 1) itself. If related, the visibility status of that view 242 within refresh framework 234 may be updated such that data refreshing can be performed. As such, implementation using Apache Flex, may include the monitoring of all views, instead of just registered ones. Using other application frameworks 232, it may not be necessary to monitor all views.

At block 610, if the visibility status of one of the monitored views 242 (e.g., View 1) changes from invisible to visible, it is determined that data refreshing is required. In this case, at block 615, data refreshing is performed for view 242 (e.g., View 1) by invoking its view-level data refresh function (e.g., first data refresh function of View 1). Otherwise (data refreshing is not required), example process 600 proceeds to block 630.

At block 620 in FIG. 6, refresh controller 340 determines whether data refreshing is required for at least one other view (e.g., View 2) in the group, such as based on its visibility status. If yes (e.g., View 2 is visible), at block 625, data refreshing is performed by invoking its data refresh function (e.g., second data refresh function of View 2). Otherwise (data refreshing is not required), example process 600 proceeds to block 630.

At block 630 in FIG. 6, refresh controller 340 monitors the data stability status of each view 242 (e.g., View 1) in the group using view-level data stability functions (e.g., by invoking first data stability function of View 1). For example, the data may become unstable after a new object (e.g., "database" object) is created. Since the creation takes time, the data relating to the new object remains unstable until the creation completes. The data shown on View 1 may also be unstable while the data is updated or deleted.

At blocks 635 and 640 in FIG. 6, data refreshing is determined as required if the data stability status of one of the monitored views 242 (e.g., View 1) indicates that data instability, and that view 242 (e.g., View 1) is visible. In this case, at block 645, data refreshing is performed for view 242 (e.g., View 1) by invoking its data refresh function (e.g., first data refresh function of View 1). Otherwise (data refreshing is not required), example process 600 proceeds to block 660.

At block 650 in FIG. 6, refresh controller 340 determines whether data refreshing is required for at least one other view (e.g., View 2) in the group, such as based on its visibility status. If yes (e.g., View 2 is visible), at block 655, data refreshing is also performed for that view 242 (e.g., View 2) by invoking its data refresh function (e.g., second data refresh function of View 2). Otherwise (data refreshing is not required), example process 600 proceeds to block 660.

Although not shown, refresh controller 340 may continue monitoring the data stability status of view 242 (e.g., View 1) at blocks 630 to 655 and repeat the process until the data becomes stable again or data refreshing is not required (e.g., View 1 is no longer visible). The repetition may occur at suitable time interval (e.g., a few seconds or minutes), to reduce unnecessary processing costs.

At blocks 660 to 675 in FIG. 6, views 242 may be deregistered from refresh framework 234 when data refreshing is no longer required. For example, information manager 330 may maintain a list of monitored views 242. For example, using Apache Flex, the list may be implemented using the DisplayObject class, which is the base class for all objects that can be placed on the display list. The display list manages all objects displayed on user interface 240.

At block 665, when view 242 (e.g. View 1) is removed from user interface 240, it is deregistered. This means that view 242 (e.g. View 1) is removed from the monitored view list, in which case function information relating to view 242 (e.g., including any data refresh and data stability functions) will be removed by information manager 330. At block 675, example process 600 ends if no view 242 needs to be monitored (i.e. list is empty), but otherwise the above are repeated.

Since views 242 in a group are deregistered as they are removed from user interface 240, a group may be empty at one stage if all of its views 242 are deregistered. In one example, depending on application 230, the group may be maintained until application 230 is closed. This generally simplifies implementation, since a group to which views 242 may be added and removed is kept alive until application 230 is closed. In another example, a group may be deregistered once all its views 242 are deregistered. In this case, registration manager 310 may include a "Deregister group" module to deregister a group (not shown for simplicity).

Further, depending on application 230, views 242 (e.g., "View 1" to "View 5" in FIG. 2) may be children of a parent view (e.g., "View 6", not shown for simplicity). In this case, during the registration process, children views (e.g., "View 1" to "View 5") may be registered with a group associated with its parent view (e.g., "View 6") at block 510 in FIG. 5. When it is necessary to deregister view 242 (e.g., "View 1") it is deregistered from the group associated with its parent view (e.g., "View 6"). Depending on whether view-level or group-level monitoring is used, blocks 520 to 544 may then be used to register other information and example processes in FIG. 6 to FIG. 9 for data refreshing and data stability monitoring.

View-Level Data Refreshing and Group-Level Data Stability Monitoring

Figure 7:
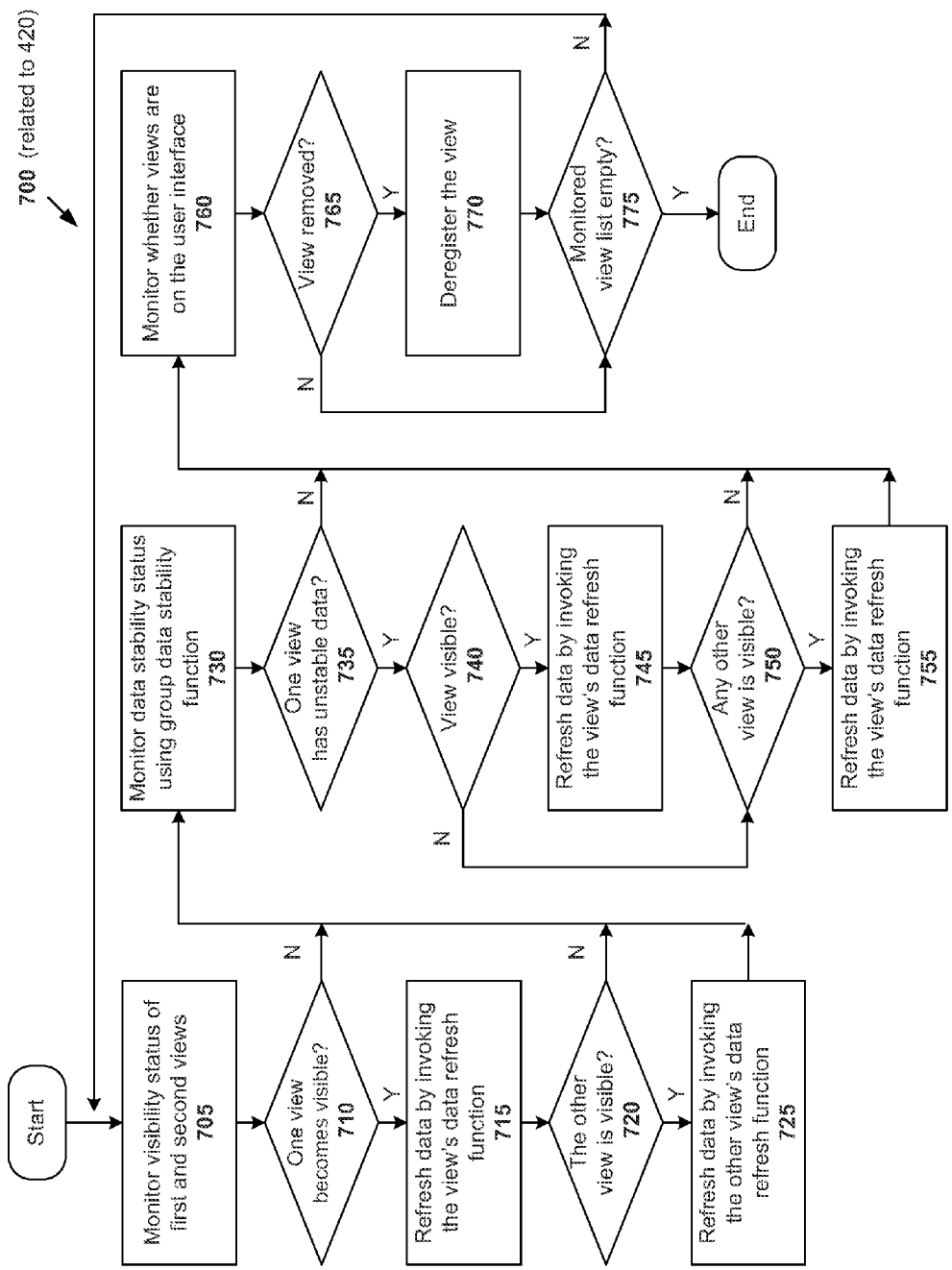
FIG. 7 is a flowchart of an example process for data refreshing of an application using view-level data refresh functions and a group-level data stability function.

FIG. 7 is a flowchart of example process 700 for data refreshing of application 230 using view-level data refresh functions and a group-level data stability function. Example process 700, which relates to example 420 in FIG. 4, may include one or more operations, functions, or actions illustrated by one or more blocks, such as blocks 705 to 775. The various blocks may be combined into fewer blocks, divided into additional blocks, and/or eliminated based upon the desired implementation.

Blocks 705 to 775 in FIG. 7 are the same as corresponding blocks 605 to 675 in FIG. 6, except that a group-level data stability function is invoked at block 730. In particular, since data stability monitoring is performed at a group level, refresh controller 340 invokes a group data stability function to monitor a data stability status of each view 242.

Using example process 700, it is not necessary for each view 242 to maintain a view-level data stability function. Since views 242 in a group may have related data items, the stability of the data items may be monitored by invoking the group-level function. This may further improve data refreshing efficiency and reduce implementation costs.

Deregistration of views 242 according to blocks 760 to 775 are the same as corresponding blocks 660 to 675 in FIG. 6. Similar examples apply.

Group-Level Data Refreshing and View-Level Data Stability Monitoring

Figure 8:
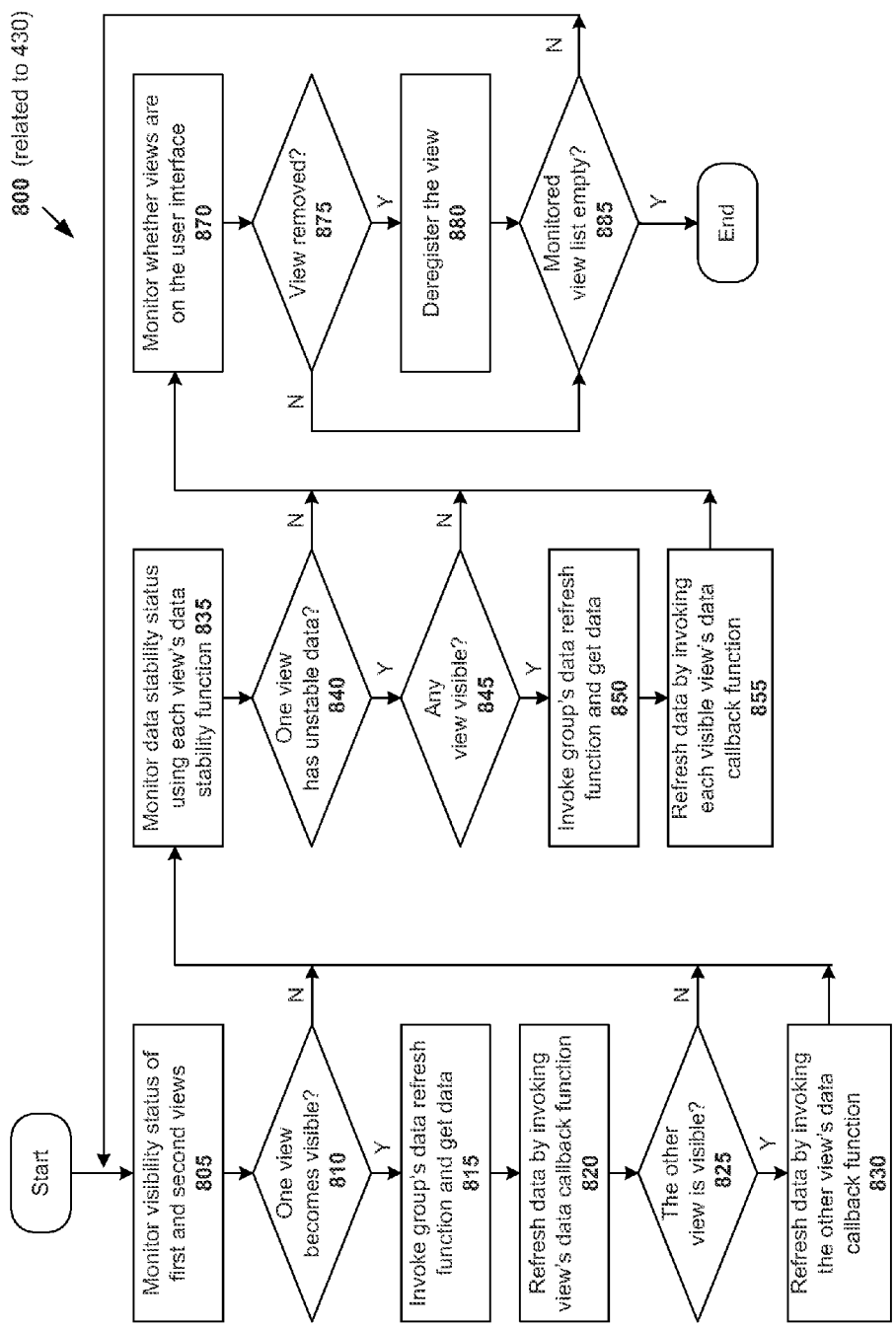
FIG. 8 is a flowchart of an example process for data refreshing of an application using a group-level data refresh function and view-level data stability functions.

FIG. 8 is a flowchart of example process 800 for data refreshing of application 230 using a group-level data refresh function and view-level data stability functions. Example process 800, which relates to example 430 in FIG. 4, may include one or more operations, functions, or actions illustrated by one or more blocks, such as blocks 805 to 885. The various blocks may be combined into fewer blocks, divided into additional blocks, and/or eliminated based upon the desired implementation.

Blocks 805 and 810 in FIG. 8 are the same as corresponding blocks 605 and 610 in FIG. 6. Since a group-level data refresh function is used, at blocks 815 and 820, refresh controller 340 invokes the group data refresh function associated with view 234 (e.g., View 1 whose visibility status changes to visible) to fetch data. At block 820, based on the fetched data, data refreshing is performed for view 243 (e.g., View 1) by invoking its data callback function (e.g., first data callback function of View 1).

At blocks 825 and 830 in FIG. 8, refresh controller 340 determines whether data refreshing is required for at least one other view (e.g., View 2) in the group. If yes (e.g., View 2 is also visible), at block 830, refresh controller 340 performs data refreshing for that view 242 (e.g., View 2) by invoking its data callback function (e.g., second data callback function of View 2). Depending on the type of data shown on view 242 (e.g., View 2), all or part of the data fetched using the group data refresh function may be used. Otherwise (data refreshing is not required for View 2), example process 800 proceeds to block 835.

Blocks 835 to 845 are the same as corresponding blocks 630 and 640 in FIG. 6. At block 840, if any view 242 has an unstable data status, refresh controller 340 determines whether the view 242 is visible and requires data refreshing. At block 850, however, once it is determined that data refreshing is required for view 242 (e.g., View 1) because its data is unstable and it is visible, refresh controller 340 invokes the group data refresh function to fetch data. At block 855, data refreshing is then performed by invoking the view's data callback function. Although not shown in FIG. 8 for simplicity, refresh controller 340 may repeat blocks 845 to 855 for at least one other view 242 (e.g., View 2) in the group that is also determined to be visible at block 840. Blocks 845 to 855 may also be repeated (e.g., at fixed intervals) until the data is stable again.

Deregistration of views 242 according to blocks 870 to 885 are the same as corresponding blocks 660 to 675 in FIG. 6. Similar examples apply.

Group-Level Data Refreshing and Group-Level Data Stability Monitoring

Figure 9:
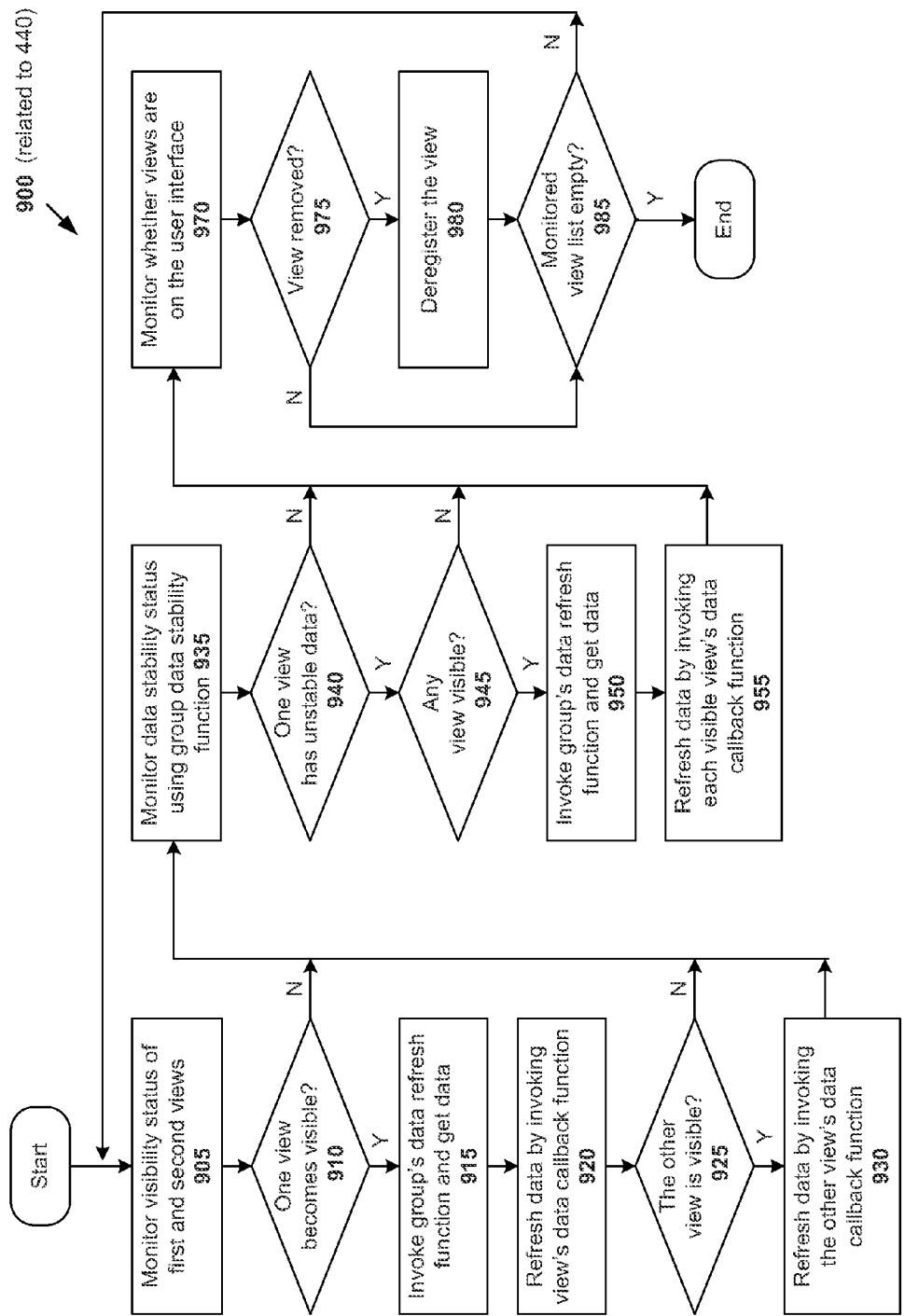
FIG. 9 is a flowchart of an example process for data refreshing of an application using a group-level data refresh function and a group-level data stability function.

FIG. 9 is a flowchart of example process 900 for data refreshing of application 230 using group-level data refresh function and group-level data stability function. Example process 900, which relates to example 440 in FIG. 4, may include one or more operations, functions, or actions illustrated by one or more blocks, such as blocks 905 to 985. The various blocks may be combined into fewer blocks, divided into additional blocks, and/or eliminated based upon the desired implementation.

Blocks 905 to 985 in FIG. 9 are the same as corresponding blocks 805 to 885 in FIG. 8, except that a group-level data stability function is invoked at block 935. In particular, since data stability monitoring is performed for the entire group of views 242 (e.g., View 1 and View 2), refresh controller 340 invokes a group data stability function to monitor a data stability status of the views 242.

Since views 242 in a group may have related data items, the stability of the data items may be monitored by invoking the group-level function. Similar to example process 700, it is not necessary in example process 900 for each view 242 to maintain a view-level data stability function. This may further improve data refreshing efficiency and reduce implementation costs.

Deregistration of views 242 according to blocks 970 to 985 are the same as corresponding blocks 660 to 675 in FIG. 6. Similar examples apply.

Virtualized Computing Environment

Figure 10:
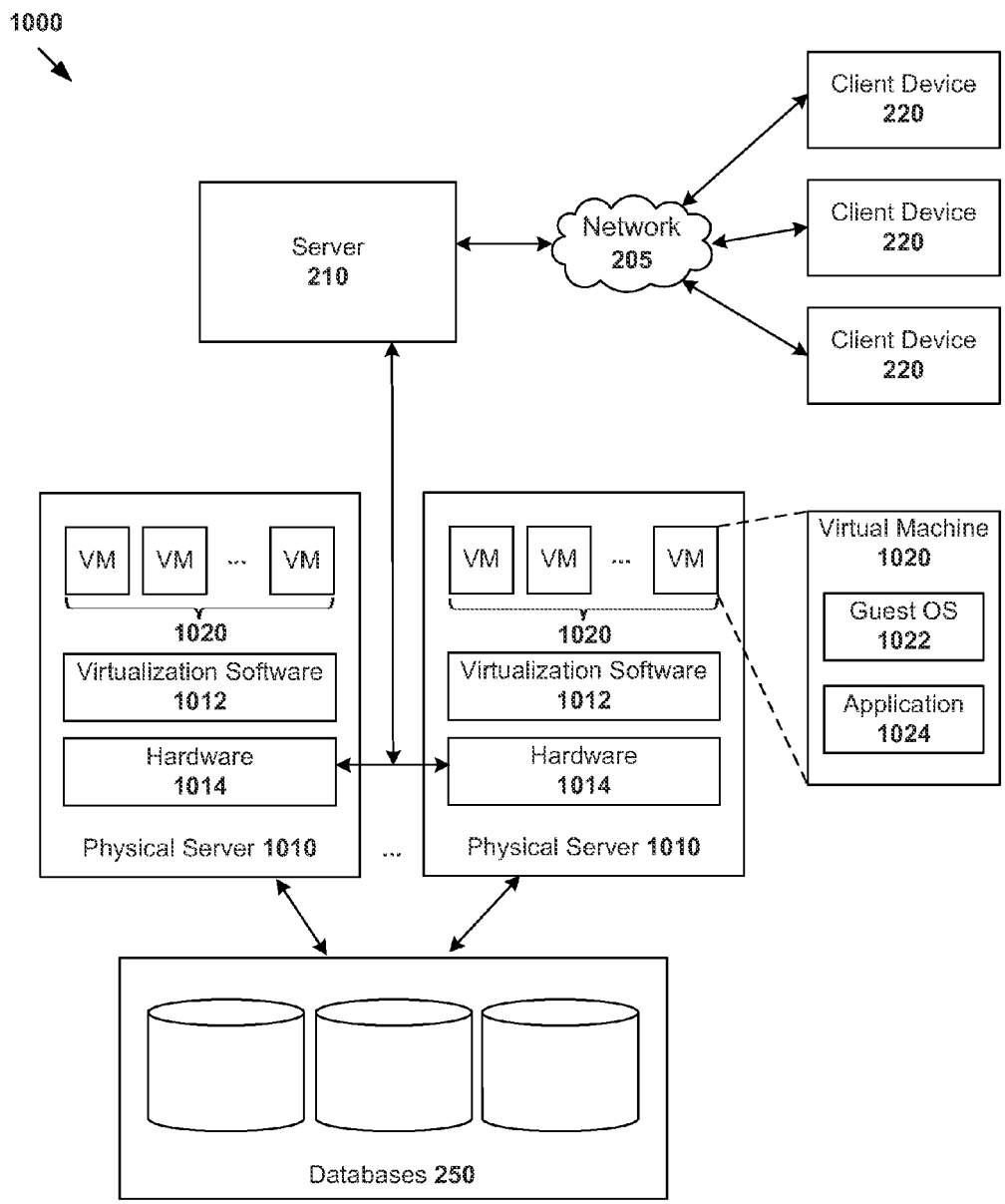
FIG. 10 is a schematic diagram illustrating an example virtualized computing environment in which data refreshing of an application may be implemented.

FIG. 10 is a schematic diagram illustrating example virtualized computing environment 1000 in which data refreshing of application 230 may be performed. Although one example is shown, it should be understood that there may be additional or alternative components, and a different configuration.

In this case, application 230 is a web application supported by server 210. Similar to the example in FIG. 2, server 210 is accessible by client devices 220 to access web application 230 implemented based on web application framework 232. Refresh framework 234 facilitates data refreshing of web application 230 according to the examples in FIG. 1 to FIG. 9. Data may be retrieved from and/or provided to databases 250 during data refreshing.

Server 210 is connected to physical servers 1010 (also known as "hosts") that each execute virtualization software 1012 (e.g., hypervisor) and include suitable hardware 1014 to support multiple virtual machines 1020. Virtualization software 1012 also maintains a mapping between virtual resources and physical resources, such as CPU resources (e.g., processors), memory resources (e.g., random access memory), network resources (e.g., access networks) and storage resources (e.g., storage using databases 250). Each virtual machine 1020 may support guest operating system 1022 and at least one application 1024 (e.g., database instance).

Services supported by server 210 and accessible (e.g., via an application programming interface) may include the provisioning, management and maintenance of storage resources (e.g., databases 250), CPU resources, memory resources, network resources, virtual machines 1020, etc. The services may also be related to the provisioning, management and maintenance of "objects" stored in storage resources and/or memory resources, etc.

Computer System

Figure 11:
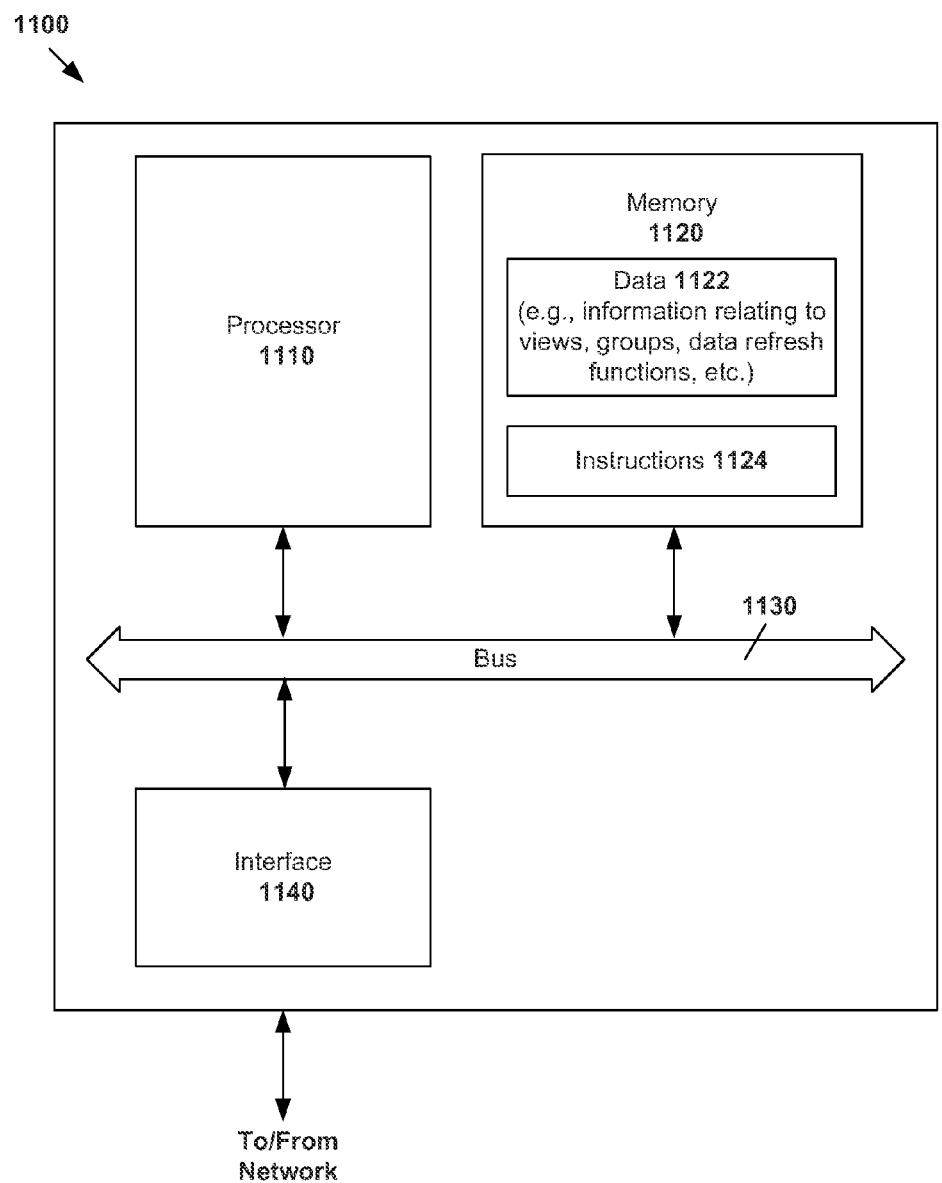
FIG. 11 is a schematic diagram illustrating a computer system for data refreshing of an application.

The above examples can be implemented by hardware, software or firmware or a combination thereof. FIG. 11 is an example system configured to perform data refreshing of application 230, in accordance to at least some examples in the present disclosure. Example system 1100 may include processor 1110, memory 1120, network interface device 1140, and bus 1130 that facilitate communication among these illustrated components and other components.

Processor 1110 is to perform processes described herein with reference to FIG. 1 to FIG. 10. Memory 1120 may store relevant data or information 1122 to perform data refreshing of application 230, such as information relating to views 242, groups, data refresh functions, data stability functions, etc. Memory 1120 may further store machine-readable instructions 1124 executable by processor 1110 to cause processor 1110 to perform processes described herein with reference to FIG. 1 to FIG. 10.

The methods, processes and components described herein may be implemented by hardware (including hardware logic circuitry), software or firmware or a combination thereof. The term 'processor' is to be interpreted broadly to include a processing unit, ASIC, logic unit, or programmable gate array etc. The techniques introduced above may be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others.

Software and/or firmware to implement the techniques introduced here may be stored on a non-transitory machine-readable storage medium and may be executed by one or more general-purpose or special-purpose programmable microprocessors. A "machine-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). For example, a machine-accessible storage medium includes recordable/non recordable media (e.g., read-only memory (ROM), random access memory (RAM), magnetic disk storage media, optical storage media, flash memory devices, etc.)

The figures are only illustrations of an example, wherein the units, components or processes shown in the figures are not necessarily essential for implementing the present disclosure. Those skilled in the art will understand that the units in the device in the example can be arranged in the device in the examples as described, or can be alternatively located in one or more devices different from that in the examples. The units in the examples described can be combined into one module or further divided into a plurality of sub-units.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

We claim:

1. A method to perform data refreshing of an application, the method comprising:
    registering a first view and a second view of the application to a group to which both the first view and the second view belong, wherein the first view is associated with a first function that is invocable to refresh data shown on the first view, and the second view is associated with a second function that is invocable to refresh data shown on the second view;
    in response to determination that data refreshing is required for the first view in the group based on a visibility status of the first view and a data stability status of data shown on the first view, performing data refreshing of the first view in the group by invoking the first function associated with the first view; and
    in response to determination that data refreshing is also required for the second view in the group, performing data refreshing of the second view by invoking the second function associated with the second view.

2. The method of claim 1, wherein:
    determination that data refreshing is required for the first view comprises determining that the visibility status of the first view changes from invisible to visible; and
    determination that data refreshing is required for the second view comprises: determining that a visibility status of the second view is visible.

3. The method of claim 2, wherein registering the first view and the second view is to facilitate data refreshing of the first view and the second view at a view level and further comprises:
    registering a first data refresh function, being the first function, associated with the first view; and registering a second data refresh function, being the second function, associated with the second view.

4. The method of claim 2, wherein registering the first view and the second view is to facilitate data refreshing of the first view and the second view at a group level and further comprises:
    registering a group data refresh function that is invocable to retrieve data for the first view and the second view, and the first function is a first data callback function associated with the first view and the second function is a second data callback function associated with the second view.

5. The method of claim 4, wherein performing data refreshing further comprises: based on data retrieved by invoking the group data refresh function, invoking the first data callback function to refresh data shown on the first view and invoking the second data callback function to refresh data shown on the second view.

6. The method of claim 2, wherein:
    determination that data refreshing is required for the first view further comprises determining that the data stability status of data shown on the first view indicates that the data shown on the first view is unstable; and
    determination that data refreshing is required for the second view further comprises determining that a data stability status of data shown on the second view indicates that the data shown on the second view is unstable.

7. The method of claim 6, wherein registering the first view and second view further comprises registering:
    a first data stability function associated with the first view that is invocable to determine the data stability status of data shown on the first view; and
    a second data stability function associated with the second view that is invocable to determine the data stability status of data shown on the second view.

8. The method of claim 6, wherein:
    registering the first view and second view further comprises registering a group data stability function that is invocable to determine a group data stability status for the group of first view and second view; and
    determination that data refreshing is required for the first view or the second view, or both, comprises invoking the group data stability function.

9. The method of claim 6, further comprising repeating the data refreshing of both the first view and second view in the group until the data stability status indicates that the data shown on the first view and the second view is stable.

10. The method of claim 1, wherein the first view and second view are registered with a refresh framework that supports:
    a registration manager to register the first view and second view to the group;
    an information manager to store information relating to the group, first function and second function; and
    a refresh controller to perform data refreshing of the first view and second view based on the information stored by the information manager.

11. The method of claim 10, further comprising deregistering the first view or second view when it is removed from a display object list managed by the refresh framework.

12. The method of claim 10, wherein the refresh framework is part of an application framework and the application is one of: a web application, desktop application and mobile application.

13. A non-transitory computer-readable storage medium that includes a set of instructions which, in response to execution by a processor, causes the processor to perform data refreshing of an application, the method comprising:
registering a first view and a second view of the application to a group to which both the first view and the second view belong, wherein the first view is associated with a first function that is invocable to refresh data shown on the first view, and the second view is associated with a second function that is invocable to refresh data shown on the second view;
in response to determination that data refreshing is required for the first view in the group based on a visibility status of the first view and a data stability status of data shown on the first view, performing data refreshing of the first view in the group by invoking the first function associated with the first view; and
in response to determination that data refreshing is also required for the second view in the group, performing data refreshing of the second view by invoking the second function associated with the second view.

14. The non-transitory computer-readable storage medium of claim 13, wherein:
determination that data refreshing is required for the first view comprises determining that the visibility status of the first view changes from invisible to visible; and
determination that data refreshing is required for the second view comprises determining that a visibility status of the second view is visible.

15. The non-transitory computer-readable storage medium of claim 14, wherein registering the first view and the second view is to facilitate data refreshing of the first view and the second view at a view level and further comprises:
registering a first data refresh function, being the first function, associated with the first view; and registering a second data refresh function, being the second function, associated with the second view.

16. The non-transitory computer-readable storage medium of claim 14, wherein registering the first view and the second view is to facilitate data refreshing of the first view and the second view at a group level and further comprises:
registering a group data refresh function that is invocable to retrieve data for the first view and the second view, and the first function is a first data callback function associated with the first view and the second function is a second data callback function associated with the second view.

17. The non-transitory computer-readable storage medium of claim 16, wherein performing data refreshing further comprises: based on data retrieved by invoking the group data refresh function, invoking the first data callback function to refresh data shown on the first view and invoking the second data callback function to refresh data shown on the second view.

18. The non-transitory computer-readable storage medium of claim 14, wherein:
determination that data refreshing is required for the first view further comprises determining that the data stability status of data shown on the first view indicates that the data shown on the first view is unstable; and
determination that data refreshing is required for the second view further comprises determining that a stability status of data shown on the second view indicates that the data shown on the second view is unstable.

19. The non-transitory computer-readable storage medium of claim 18, wherein registering the first view and second view further comprises registering:
a first data stability function associated with the first view that is invocable to determine the data stability status of data shown on the first view; and
a second data stability function associated with the second view that is invocable to determine the data stability status of data shown on the second view.

20. The non-transitory computer-readable storage medium of claim 18, wherein:
registering the first view and second view further comprises registering: a group data stability function that is invocable to determine a group data stability status for the group of first view and second view; and
determination that data refreshing is required for the first view or the second view, or both, comprises invoking the group data stability function.

21. The non-transitory computer-readable storage medium of claim 18, further comprising repeating the data refreshing of both the first view and second view in the group until the data stability status indicates that the data shown on the first view and the second view is stable.

22. A computer system to perform data refreshing of an application, wherein the computer system comprises:
a processor; and
a non-transitory computer readable medium having stored thereon instructions that, in response to execution by the processor, cause the processor to:
register a first view and a second view of the application to a group to which both the first view and the second view belong, wherein the first view is associated with a first function that is invocable to refresh data shown on the first view, and the second view is associated with a second function that is invocable to refresh data shown on the second view;
in response to determination that data refreshing is required for the first view in the group based on a visibility status of the first view and a data stability status of data shown on the first view, perform data refreshing of the first view in the group by invoking the first function associated with the first view; and
in response to determination that data refreshing is also required for the second view in the group, perform data refreshing of the second view by invoking the second function associated with the second view.

23. The computer system of claim 22, wherein:
the instructions for determining that data refreshing is required for the first view further cause the processor to determine that the visibility status of the first view changes from invisible to visible; and
the instructions for determining that data refreshing is required for the second view further cause the processor to determine that a visibility status of the second view is visible.

24. The computer system of claim 22, wherein:
the instructions for determining that data refreshing is required for the first view cause the processor to determine that the data stability status of data shown on the first view indicates that the data shown on the first view is unstable; and
the instructions for determining that data refreshing is required for the second view further cause the processor to determine that a data stability status of data shown on the second view indicates that the data shown on the second view is unstable.

25. The computer system of claim 23, wherein the instructions further cause the processor to implement a refresh framework to which the first view and second view are registered, the refresh framework comprising:
  a registration manager to register the first view and second view to the group;
  an information manager to store information relating to the group, first function and second function; and
  a refresh controller to perform data refreshing of the first view and second view based on the information stored by the information manager.

* * * * *